United States Patent
Wu (10) Patent No.: US 11,645,736 B2
(45) Date of Patent: May 9, 2023

(54) IMAGE PROCESSING METHODS, APPARATUSES AND SYSTEMS

(71) Applicants: BEIJING NEUSOFT MEDICAL EQUIPMENT CO., LTD., Beijing (CN); Neusoft Medical Systems Co., Ltd., Liaoning (CN)

(72) Inventor: Chengyang Wu, Beijing (CN)

(73) Assignees: BEIJING NEUSOFT MEDICAL EQUIPMENT CO., LTD., Beijing (CN); Neusoft Medical Systems Co., Ltd., Liaoning (CN)

( * ) Notice: Subject to any disclaimer, the term of this patent is extended or adjusted under 35 U.S.C. 154(b) by 167 days.

(21) Appl. No.: 17/187,051

(22) Filed: Feb. 26, 2021

(65) Prior Publication Data

US 2021/0272243 A1   Sep. 2, 2021

(30) Foreign Application Priority Data

Feb. 28, 2020   (CN) .......................... 202010130515.9

(51) Int. Cl.
    *G06T 5/00*    (2006.01)
    *G06T 7/13*    (2017.01)
    *G06T 7/33*    (2017.01)

(52) U.S. Cl.
    CPC ................ *G06T 5/002* (2013.01); *G06T 7/13* (2017.01); *G06T 7/337* (2017.01);
(Continued)

(58) Field of Classification Search
    CPC ........... G06T 5/002; G06T 7/13; G06T 7/337; G06T 2207/10081; G06T 2207/20084;
(Continued)

(56) References Cited

U.S. PATENT DOCUMENTS 10,949,952 B2   3/2021  Huang et al.
2002/0164074 A1* 11/2002  Matsugu ................ G06V 10/46
                                              382/199
(Continued)

FOREIGN PATENT DOCUMENTS

| CN | 103186888 A | 7/2013 |
|---|---|---|
| CN | 107633486 A | 1/2018 |

(Continued)

OTHER PUBLICATIONS

Fu et al., "Image Denoising Using Nonsampled Contourlet Transform and Muiti-scale Thresholds," Computer Science, Nov. 2009, 3 6(11):286-289 (with English abstract).

(Continued)

Primary Examiner — Jose L Couso
(74) Attorney, Agent, or Firm — Fish & Richardson P.C.

(57) ABSTRACT

Methods, systems, and apparatus for image processing are provided. In one aspect, a method includes: acquiring an image to be processed that involves a target object, extracting image noise information and contour information of the target object from the image to be processed, generating a noise distribution image based on the image noise information and the contour information of the target object, and obtaining a target image by performing noise reduction on the image to be processed with the noise distribution image.

19 Claims, 3 Drawing Sheets

(52) U.S. Cl.
CPC ............... *G06T 2207/10081* (2013.01); *G06T 2207/20084* (2013.01); *G06T 2207/20182* (2013.01); *G06T 2207/30004* (2013.01)

(58) Field of Classification Search
CPC . G06T 2207/20182; G06T 2207/30004; G06T 2207/10116; G06T 2207/20081; G06T 7/30; G06T 2207/30204; G06T 5/003; G06T 7/0012; G06T 2207/10004; G06T 2207/20024; G06T 3/4046; G06T 9/002; G06N 3/0454; G06N 3/084; G06N 3/02; G06N 3/08–088; G06N 7/00; G06N 20/00; G06K 9/00; G06K 9/62; G06K 9/629; G06K 9/6267; G06K 9/00536; G06K 9/627; G06K 7/1482; G06V 10/30; G06V 10/443; G06V 10/454; G06V 10/82; G06V 30/18057; H04N 5/21; H04N 5/357
See application file for complete search history.

(56) References Cited

U.S. PATENT DOCUMENTS

| | | | | |
|---|---|---|---|---|
| 2003/0174890 | A1* | 9/2003 | Yamauchi | A61B 8/08 |
| | | | | 382/199 |
| 2004/0001621 | A1* | 1/2004 | Kusakabe | G06T 5/002 |
| | | | | 382/164 |
| 2007/0098245 | A1* | 5/2007 | Mylaraswamy | G06T 7/0004 |
| | | | | 382/199 |
| 2008/0316364 | A1* | 12/2008 | Au | H04N 19/19 |
| | | | | 348/608 |
| 2009/0257672 | A1* | 10/2009 | Sullender | G06T 5/20 |
| | | | | 382/260 |
| 2019/0130292 | A1* | 5/2019 | N | G06N 5/047 |
| 2019/0365341 | A1* | 12/2019 | Chan | A61B 6/5258 |
| 2020/0074234 | A1* | 3/2020 | Tong | G06V 10/82 |
| 2020/0241098 | A1* | 7/2020 | Shinoda | G06T 5/002 |
| 2021/0104021 | A1* | 4/2021 | Sohn | G06N 3/08 |

FOREIGN PATENT DOCUMENTS

| | | |
|---|---|---|
| CN | 107818300 A | 3/2018 |
| CN | 108765319 A | 11/2018 |
| CN | 108876734 A | 11/2018 |
| CN | 109035163 A | 12/2018 |
| CN | 110717888 A | 1/2020 |
| JP | 2019212275 A | 12/2019 |

OTHER PUBLICATIONS

Fu et al., "Patch-based contour prior image denoising for salt and pepper noise," Multimedia Tools and Applications, Nov. 2018, 78:30865-30875.

Office Action and Search Report in Chinese Application No. 202010130515.9, dated Feb. 12, 2023, 8 pages (with machine translation).

* cited by examiner

IMAGE PROCESSING METHODS, APPARATUSES AND SYSTEMS

CROSS-REFERENCE TO RELATED APPLICATIONS

The present disclosure claims a priority of the Chinese patent application No. 202010130515.9 filed on Feb. 28, 2020 and entitled "IMAGE PROCESSING METHODS, APPARATUSES AND SYSTEMS", which is incorporated herein by reference in its entirety.

TECHNICAL FIELD

The present disclosure relates to medical image processing methods, apparatuses and systems.

BACKGROUND

Some medical equipment uses the principle of ray for imaging, for example, CT (Computed Tomography) equipment uses X-rays for imaging, and DSA (Digital Subtraction Angiography) equipment uses X-rays for imaging, etc. This type of equipment may mainly include a ray source used to emit rays and a detector used to detect rays passing through a scanned object, and may use the rays detected by the detector for imaging.

SUMMARY

The present disclosure provides methods, devices, systems and apparatus for image processing.

In general, one innovative aspect of the subject matter described in this specification can be embodied in methods that include the actions of image processing, including: acquiring an image to be processed that involves a target object, extracting image noise information and contour information of the target object from the image to be processed, generating a noise distribution image based on the image noise information and the contour information of the target object, and obtaining a target image by performing noise reduction on the image to be processed with the noise distribution image.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination.

In some embodiments, extracting the image noise information and the contour information of the target object from the image to be processed includes extracting the image noise information and the contour information of the target object from the image to be processed using an information extraction sub-network of a neural network. Generating the noise distribution image based on the image noise information and the contour information of the target object includes generating the noise distribution image based on the image noise information and the contour information of the target object using an image generation sub-network of the neural network.

In some embodiments, the method further includes: training the image generation sub-network by acquiring a first sample image and a second sample image, where the first sample image is labelled with pixel information and sample contour information, and the second sample image is obtained by adding noise to the first sample image, inputting the second sample image into the neural network to obtain a sample noise distribution image output from the neural network, obtaining a sample target image by performing noise reduction on the second sample image with the sample noise distribution image, and adjusting network parameters of the image generation sub-network based on a difference in pixel values between the first sample image and the sample target image and a difference in contour information between the first sample image and the sample target image.

In some embodiments, adjusting the network parameters of the image generation sub-network based on the difference in pixel values between the first sample image and the sample target image and the difference in contour information between the first sample image and the sample target image includes: determining a statistical value based on the difference in pixel values and the difference in contour information, and adjusting the network parameters of the image generation sub-network such that the statistical value is less than a preset value.

In some embodiments, each of the difference in pixel values and the difference in contour information is expressed in a form of a pixel matrix, and determining the statistical value based on the difference in pixel values and the difference in contour information includes: performing a weighted summation on the difference in pixel values and the difference in contour information.

In some embodiments, obtaining the target image by performing noise reduction on the image to be processed with the noise distribution image includes: obtaining the target image by determining a difference in pixel values between the image to be processed and the noise distribution image.

In some embodiments, obtaining the target image by performing noise reduction on the image to be processed with the noise distribution image includes: determining a difference in pixel values between the image to be processed and the noise distribution image to obtain a first-level noise-reduced image of the image to be processed, obtaining a registered image by performing a registration, with taking the first-level noise-reduced image of the image to be processed as a registration target, on a first-level noise-reduced image of a historical image captured before the image to be processed, and obtaining the target image by performing time-domain noise reduction on the first-level noise-reduced image of the image to be processed based on the registered image.

In some embodiments, obtaining the registered image includes: determining an image deformation field based on the first-level noise-reduced image of the image to be processed and the first-level noise-reduced image of the historical image, and obtaining the registered image by registering the first-level noise-reduced image of the historical image to the first-level noise-reduced image of the image to be processed by using the image deformation field.

In some embodiments, determining the image deformation field includes using a deformation field generation sub-network of a neural network. The method can further include training the deformation field generation sub-network by: acquiring a plurality of sample images, for each of the plurality of sample images, obtaining a noise distribution image of the sample image, obtaining a first-level noise-reduced image of the sample image based on a difference in pixel values between the sample image and the noise distribution image of the sample image, inputting a first-level noise-reduced image of a corresponding historic image and the first-level noise-reduced image of the sample image into the deformation field generation sub-network to obtain a corresponding image deformation field, obtaining a corresponding registered image by performing a corresponding registration on the first-level noise-reduced image of the corresponding historical image using the corresponding image deformation field, determining a corresponding difference in pixel values between the first-level noise-reduced image of the sample image and the corresponding registered image, and adjusting network parameters of the deformation field generation sub-network based on the corresponding difference in pixel values.

The exemplary embodiments will be described in detail here, and examples thereof are illustrated in the accompanying drawings. When the following description refers to the accompanying drawings, unless otherwise stated, the same reference signs in different drawings designate the same or similar elements. The implementation manners described in the following exemplary embodiments do not represent all implementation manners consistent with the present application. On the contrary, they are merely examples of devices and methods consistent with some aspects of the present application as defined in the appended claims.

BRIEF DESCRIPTION OF DRAWINGS

The drawings herein, which are incorporated into the specification and constitute a part of the present disclosure, illustrate examples consistent with the present disclosure, and are used together with the specification to explain the principle of the present disclosure.

DETAILED DESCRIPTION

During an imaging process, a certain amount of noise may be generated due to X-ray scattering and performance of a detector, resulting in a blurred image and a poor image quality. This problem is typically solved by increasing an X-ray dose. However, a larger dose of X-rays may produce greater radiation hazards, and seriously affect the health of patients and doctors.

Implementations of the present disclosure provide an image processing method, which is applied to an image processing system. In the medical field, there are a variety of applicable image processing systems, such as CT systems, DSA systems, and other systems with scanning functions, or systems that are independent of the systems with scanning functions and are only used for image processing.

Figure 1:
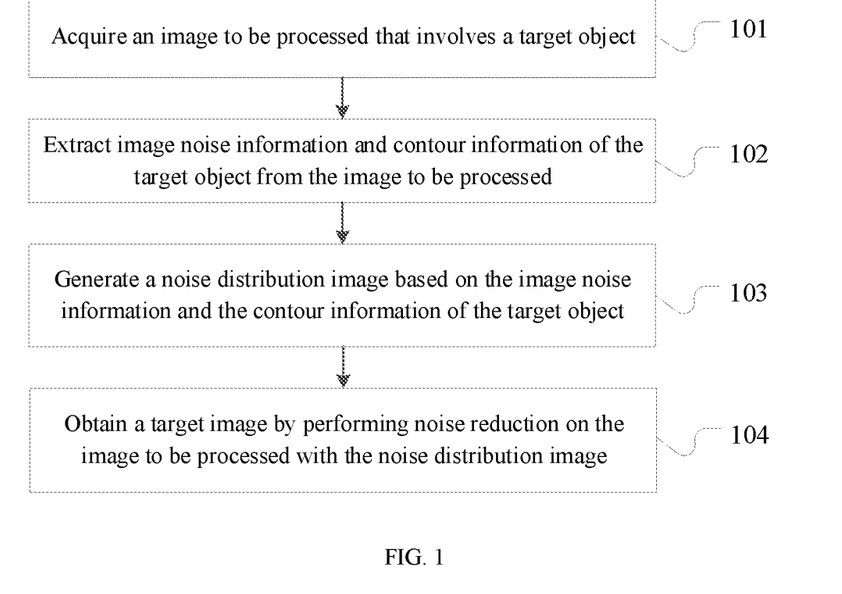
FIG. 1 is a flowchart illustrating an image processing method according to an example of the present disclosure.

FIG. 1 is a flowchart illustrating an image processing method according to an example of the present disclosure. The image processing method shown in FIG. 1 may include steps 101-104.

At step 101, an image to be processed is acquired, and the image to be processed involves a target object.

The image to be processed may contain noise. If the image processing system uses the principle of ray for imaging, the image to be processed at this step may be an image containing noise obtained by the image processing system after scanning.

In the medical field, the target object may be an entire body of a patient, a designated body portion of a patient, or a designated object (such as a scanning bed). The image to be processed may involve one or more target objects.

At step 102, image noise information and contour information of the target object are extracted from the image to be processed.

The image noise information and the contour information of the target object may both be expressed in the form of a pixel matrix. A value of each pixel point in the pixel matrix, e.g., a pixel value, may be a gray-scale value.

In an example, the image processing system may obtain a neural network in advance, and use the neural network for image processing. In some cases, the neural network includes an information extraction sub-network, and the operation of the image processing system to extract the image noise information and the contour information of the target object from the image to be processed may be implemented by using the information extraction sub-network to extract the image noise information and the contour information of the target object from the image to be processed. For example, the image to be processed may be input into the information extraction sub-network to obtain the image noise information and the contour information of the target object output from the information extraction sub-network.

The information extraction sub-network may include a first information extraction sub-network and a second information extraction sub-network. The first information extraction sub-network and the second information extraction sub-network may be cascaded. The image processing system may use the first information extraction sub-network to extract the image noise information from the image to be processed, and use the second information extraction sub-network to extract the contour information of the target object from the image to be processed.

In some examples, the image to be processed may be input into the first information extraction sub-network and the second information extraction sub-network, respectively, to obtain the image noise information output from the first information extraction sub-network, and the contour information of the target object output from the second information extraction sub-network.

In some examples, the first information extraction sub-network may be a pre-trained residual network, and the second information extraction sub-network may be a pre-trained migration network, such as a pre-trained VGG16 network.

At step 103, a noise distribution image is generated based on the image noise information and the contour information of the target object.

In an example, the neural network obtained in advance may include an image generation sub-network in addition to the information extraction sub-network. The image generation sub-network may perform feature extraction and calculation based on the input image noise information and contour information of the target object to obtain the noise distribution image.

The operation of the image processing system to generate the noise distribution image may be implemented by using the image generation sub-network to generate the noise distribution image based on the image noise information and the contour information of the target object. In some examples, the image noise information and the contour information of the target object may be input into the image generation sub-network to obtain the noise distribution image output from the image generation sub-network.

At step 104, a target image is obtained by performing noise reduction on the image to be processed with the noise distribution image.

The target image can be a noise-reduced image of the image to be processed.

There are many ways to determine the target image based on the image to be processed and the noise distribution image. For example, the first way is to determine a difference in pixel values between the image to be processed and the noise distribution image to obtain the target image.

In implementation, the image to be processed and the noise distribution image may both be expressed in the form of a pixel matrix, and a difference between pixel values at the same positions in these two pixel matrices may be determined, and the resulting difference matrix may be used as a pixel matrix of the target image, thereby obtaining the target image.

The second way is as follows: firstly, the difference in pixel values between the image to be processed and the noise distribution image may be determined to obtain a first-level noise-reduced image of the image to be processed; secondly, a registered image may be obtained by performing a registration, with taking the first-level noise-reduced image of the image to be processed as a registration target, on a first-level noise-reduced image of a historical image which is captured before the image to be processed; and finally, time-domain noise reduction may be performed on the first-level noise-reduced image of the image to be processed based on the registered image to obtain the target image.

The image processing system may determine an image deformation field based on the first-level noise-reduced image of the image to be processed and the first-level noise-reduced image of the historical image, and register the first-level noise-reduced image of the historical image to the first-level noise-reduced image of the image to be processed by using the image deformation field, thereby obtaining the registered image.

The first-level noise-reduced image of the image to be processed and the registered image may both be expressed in the form of a pixel matrix, and pixel values may be determined for two pixel matrices. For example, average pixel values may be determined for the two pixel matrices. In some examples, an average of pixel values at the same positions in the two pixel matrices may be determined, and the resulting average matrix may be used as the pixel matrix of the target image, thereby obtaining the target image. Alternatively, pixel weights may be determined for the two pixel matrices. In some examples, one of the two pixel matrices may be multiplied with its corresponding weight value to obtain a first pixel matrix, the other one of the two pixel matrices may be multiplied with its corresponding weight value to obtain a second pixel matrix, and pixel values at the same positions in the first pixel matrix and the second pixel matrix may be added, and the resulting weighted sum matrix may be used as the pixel matrix of the target image, thereby obtaining the target image.

The historical image may include one or more frames of images. When the historical image includes multi-frame images, an image deformation field may be determined for each frame of image, and multi-frame registered images may be obtained by performing a registration, with taking the first-level noise-reduced image of the image to be processed as a registration target, on each frame of image. Pixel values may be determined for the first-level noise-reduced image of the image to be processed and the multi-frame registered images to obtain the target image.

In an example, the image processing system may obtain a time-domain noise reduction network in advance, and the time-domain noise reduction network may include a deformation field generation sub-network, an image registration sub-network, and an image noise reduction sub-network. The deformation field generation sub-network is configured to generate an image deformation field. The image registration sub-network is configured to register one image to another image through the image deformation field to obtain a registered image. The image noise reduction sub-network is configured to perform time-domain noise reduction on the other image based on the registered image, to obtain a time-domain noise-reduced image of the other image.

In application, the image processing system may use the deformation field generation sub-network to generate the image deformation field of the first-level noise-reduced image of the historical image with respect to the first-level noise-reduced image of the image to be processed, use the image registration sub-network to perform a registration on the first-level noise-reduced image of the historical image through the image deformation field to obtain the registered image, and use the image noise reduction sub-network to perform the time-domain noise reduction on the first-level noise-reduced image of the image to be processed based on the registered image to obtain the target image.

In this example, after performing space noise reduction on the image to be processed, a previous frame of the image to be processed may be used to perform noise reduction on the image to be processed, thereby increasing a signal-to-noise ratio of the noise-reduced image, removing artifacts from the noise-reduced image, and improving an image noise reduction effect.

Examples of the present disclosure provide an image processing method, in which image noise information and contour information of a target object are extracted from an image to be processed, a noise distribution image is generated based on the image noise information and the contour information of the target object, and a noise-reduced image of the image to be processed is obtained based on the image to be processed and the noise distribution image, which may increase protection for the contour information, e.g., structural edge information, of the target object in the image, while ensuring an image noise reduction effect.

Figure 2:
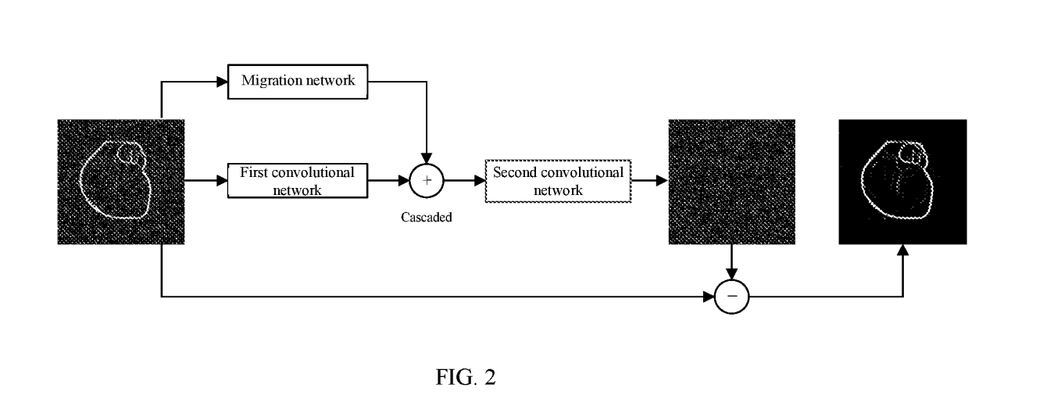
FIG. 2 is a schematic structural diagram illustrating a neural network according to an example of the present disclosure.

In an example, FIG. 2 is a schematic structural diagram illustrating a neural network according to an example of the present disclosure. The neural network and image processing method according to the present disclosure will be explained below in conjunction with FIG. 2.

The neural network may include a migration network, a first convolutional network and a second convolutional network, and the first convolutional network and the migration network may be cascaded. The migration network is configured to extract contour information of a target object from an image, and the first convolutional network is configured to extract image noise information from the image. The contour information of the target object extracted by the migration network and the image noise information extracted by the first convolutional network may be input into the second convolutional network, and the second convolutional network may obtain a noise distribution image based on the contour information of the target object and the image noise information.

The image processing system may input an image to be processed into the above neural network to obtain a noise distribution image of the image, and use the noise distribution image to perform noise reduction on the image to be processed, thereby obtaining a noise-reduced image.

For the above neural network, the number of convolutional layers in the first convolutional network and the number of convolutional layers in the second convolutional network may be adjusted according to a real-time performance of an algorithm and a field-of-view required by the system.

If a pixel value of a particular pixel point in the noise distribution image is greater than a preset upper limit of pixel value, the upper limit of pixel value may be used as the pixel value of the particular pixel point. If a pixel value of a particular pixel point in the noise distribution image is less than a preset lower limit of pixel value, the lower limit of pixel value may be used as the pixel value of the particular pixel point. In this way, an abnormal value predicted by the neural network may be removed, ensuring the accuracy of an image noise reduction result. The upper limit of pixel value and the lower limit of pixel value may be set according to experience and needs. For example, the upper limit of pixel value may be three times a standard deviation of pixel values of the noise distribution image.

Sizes of a convolution kernel and a feature field-of-view in the convolutional network may be set as needed. For example, convolutional network A includes only one convolutional layer and the convolutional layer uses a convolution kernel with a width and a height of 5, and convolutional network B includes two convolutional layers and each convolutional layer uses a convolution kernel with a width and a height of 3. Compared with the convolutional network A, the convolutional network B increases the size of the field-of-view by increasing the number of convolutional layers, which may give a full play to the advantage of less calculation with the same field-of-view.

The convolutional network may use a Leaky Rectified Linear Unit (Leaky ReLU) as an activation function to convert a linear function to nonlinear space, and use a simple linear function to fit a complex nonlinear function. The convolutional network may perform batch normalization on a processing result of each convolutional layer to reduce the risk of overfitting.

Figure 3:
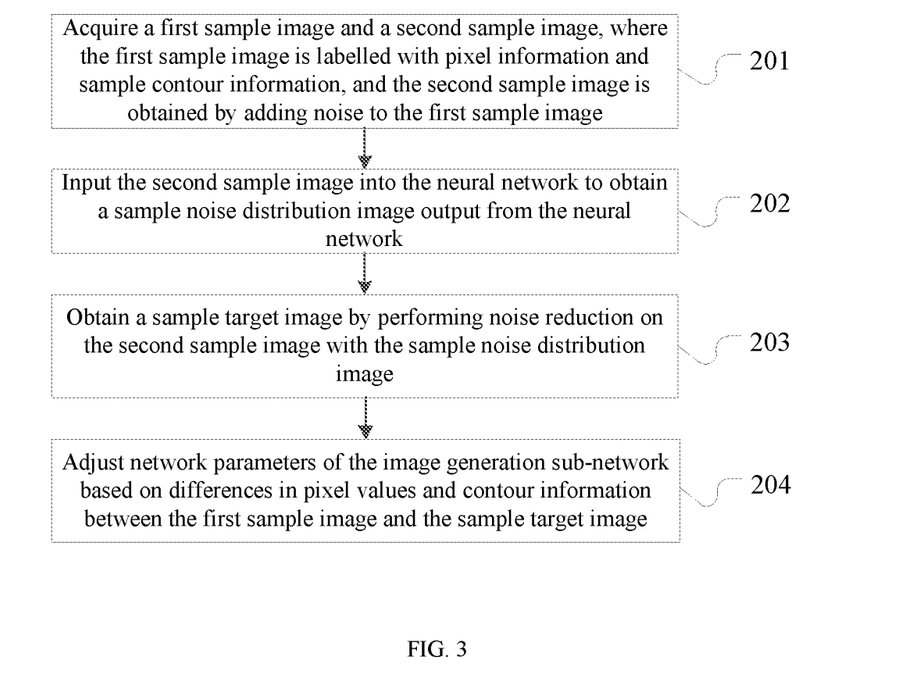
FIG. 3 is a flowchart illustrating a method of training an image generation sub-network according to an example of the present disclosure.

In an example, FIG. 3 is a flowchart illustrating a method of training an image generation sub-network according to an example of the present disclosure. The method of training an image generation sub-network shown in FIG. 3 may include steps 201-204.

At step 201, a first sample image and a second sample image are acquired, where the first sample image may be labelled with pixel information and sample contour information, and the second sample image may be obtained by adding noise to the first sample image.

The first sample image may be understood as a noise-free image, the second sample image may be understood as a noisy image, and the first sample image and the second sample image may constitute a training set.

The training set may be obtained as follows.

At step I, continuously captured multi-frame images may be acquired, and average pixel values may be determined for the continuously captured multi-frame images, to obtain a noise-free image (i.e., the first sample image).

The continuously captured multi-frame images may be obtained by a system with a scanning function after continuous scanning.

Each frame of image captured may be in the form of a pixel matrix, and a value of each pixel point in the pixel matrix is a pixel value. An average of pixel values at the same positions in a plurality of pixel matrices may be determined, and the resulting average matrix may be used as a pixel matrix of the noise-free image, thereby obtaining the noise-free image.

At step II, Anscombe transformation may be performed on the resulting noise-free image.

The Anscombe transformation may approximately transform a type of noise in an image from a mixed Poisson-Gaussian distribution to a Gaussian distribution.

The purpose of performing the Anscombe transformation on the resulting noise-free image in this example is to make a pixel value distribution and a pixel value range in the noise-free image suitable for use in the neural network.

At step III, Gaussian noise may be added to the noise-free image after the Anscombe transformation to obtain a noisy image (i.e., the second sample image).

Gaussian noise with different variances may be added to the noise-free image after the Anscombe transformation to obtain a noisy image containing different noise (i.e., the second sample image).

At step 202, the second sample image is input into the neural network to obtain a sample noise distribution image output from the neural network.

The sample noise distribution image is a noise distribution image of the second sample image.

The pre-trained neural network may have the function of obtaining a noise distribution image of an image. Input of the neural network is the image, and output of the neural network is the noise distribution image of the image.

When this step is implemented, the second sample image may be input into the information extraction sub-network in the neural network to obtain image noise information and contour information of a target object output from the information extraction sub-network, and the image noise information and the contour information of the target object may be input into the image generation sub-network to obtain the sample noise distribution image output from the image generation sub-network.

In some cases, the information extraction sub-network includes the first information extraction sub-network and the second information extraction sub-network, and the second sample image may be input into the first information extraction sub-network and the second information extraction sub-network, respectively, to obtain the image noise information output from the first information extraction sub-network and the contour information of the target object output from the second information extraction sub-network. The image noise information output from the first information extraction sub-network and the contour information of the target object output from the second information extraction sub-network may be input into the image generation sub-network to obtain the sample noise distribution image output from the image generation sub-network.

At step 203, a sample target image is obtained by performing noise reduction on the second sample image with the sample noise distribution image.

The sample target image is a noise-reduced image of the second sample image.

There are many ways to obtain the sample target image by performing noise reduction on the second sample image with the sample noise distribution image. For example, the first way is to determine a difference in pixel values between the second sample image and the sample noise distribution image to obtain the sample target image.

The second way is as follows: firstly, the difference in pixel values between the second sample image and the sample noise distribution image may be determined to obtain a first-level noise-reduced image of the second sample image; secondly, a registered image may be obtained by performing a registration, with taking the first-level noise-reduced image of the second sample image as a registration target, on a first-level noise-reduced image of a historical image which is captured before the second sample image; and finally, time-domain noise reduction may be performed on the first-level noise-reduced image of the second sample image based on the registered image to obtain the sample target image.

At step 204, network parameters of the image generation sub-network are adjusted based on differences in pixel values and contour information between the first sample image and the sample target image.

In this example, the network parameters of the image generation sub-network may be optimized through back-propagation by using a statistical value of the differences in pixel values and contour information between the first sample image and the sample target image, thereby optimizing the image generation sub-network.

In an example, the first sample image may be understood as a noise-free image, the second sample image may be obtained by adding noise to the first sample image, and the sample target image may be obtained by performing noise reduction on the second sample image using the neural network. If the neural network is optimized well, a difference between the sample target image obtained by the neural network and the first sample image is very small, or is even zero. Therefore, the difference between the first sample image and the sample target image may be used to optimize the neural network.

The difference between the first sample image and the sample target image may include a difference in pixel values and a difference in contour information, both of which may be expressed in the form of a pixel matrix. Correspondingly, at this step, the statistical value may be determined based on the difference in pixel values and the difference in contour information, and the network parameters of the image generation sub-network may be adjusted such that the statistical value is less than a preset value which is small and may be set as zero.

The operation of determining the statistical value based on the difference in pixel values and the difference in contour information may be implemented by performing weighted summation on the difference in pixel values and the difference in contour information. For example, a weight value for the difference in pixel values is n, a weight value for the difference in contour information is m, and the statistical value may be obtained by adding n times the difference in pixel values and m times the difference in contour information.

Generally, the greater the degree of noise reduction performed on the image, the more loss of the contour information (which may be understood as structural edge information), and the more blurred the contour in the resulting image. A presentation effect of an image colour and a structural contour (i.e., the structural edge information) in the target image may be adjusted by adjusting the weight value for the difference in pixel values and the weight value for the difference in contour information.

To obtain a target image with a clear contour, the contour information in the noise distribution image during the noise reduction process can be reduced, such that the contour in the target image obtained by subtracting the noise distribution image from the image to be processed may be clearly displayed. At this time, the weight value for the difference in contour information may be increased, and the weight value for the difference in pixel values may be decreased.

For example, an original weight value for the difference in contour information is m and an original weight value for the difference in pixel values is n, a new weight value for the difference in contour information is m' and a new weight value for the difference in pixel values is n' after weight value adjustment, and m, n, m' and n' satisfy $$\frac{m'}{n'} > \frac{m}{n}.$$

In an example, the statistical value may be determined based on the difference in pixel values and the difference in contour information, and the network parameters of the image generation sub-network may be adjusted such that the statistical value may be changed in one direction, for example, the statistical value may be gradually decreased. In addition, when the number of adjustment to the image generation sub-network reaches a preset number, adjustment to the network may be ended.

In an example, the deformation field generation sub-network may be trained by using the continuously captured multi-frame noisy images, that is, multi-frame second sample images (hereinafter referred to as "multi-frame images"), obtained at steps I-III in the above example. A method of training the deformation field generation sub-network may include steps a-e.

At step a, continuously captured multi-frame images may be acquired, a noise distribution image of each frame of image may be obtained according to the above method, with taking each frame of image as the current image, a difference in pixel values between the image and its noise distribution image may be determined to obtain a first-level noise-reduced image of the image, and the following steps b-e may be performed for each frame of historical image of the current image.

The continuously captured multi-frame images may include the current image and the historical image, which is captured before the current image.

At step b, for each frame of historical image, the first-level noise-reduced image thereof and the first-level noise-reduced image of the current image may be input into a pre-built deformation field generation sub-network to obtain an image deformation field output from the deformation field generation sub-network.

At step c, a registered image may be obtained by performing a registration on the first-level noise-reduced image of the historical image using the image deformation field.

At step d, a difference in pixel values between the first-level noise-reduced image of the current image and the registered image obtained at step c may be determined.

There are many ways to determine the difference in pixel values. For example, a mean square error of gray-scale values of these two images may be calculated, and the calculation result may be determined as the difference in pixel values. Alternatively, a 2-norm of gray-scale values of these two images may be calculated, and the calculation result may be determined as the difference in pixel values.

At step e, the network parameters of the deformation field generation sub-network may be adjusted based on the difference in pixel values.

In some cases, the network parameters of the deformation field generation sub-network may be adjusted such that the difference in pixel values is less than a difference threshold, that is, adjustment to the network may be ended when the difference in pixel values is less than the difference threshold. The difference threshold is small and may be set as zero. Alternatively, the network parameters of the deformation field generation sub-network may be adjusted such that the difference in pixel values may be changed in one direction, for example, the difference in pixel values may be gradually decreased. In addition, when the number of adjustment to the deformation field generation sub-network reaches a preset number, adjustment to the network may be ended.

For example, a current frame image t, a previous frame image t−1, and a frame image before the previous frame image t−2 continuously captured may be acquired, a first-level noise-reduced image of the current frame image t and a first-level noise-reduced image of the previous frame image t−1 may be input into the deformation field generation sub-network, to obtain a first image deformation field output from the deformation field generation sub-network. Then, a first registered image may be obtained by performing a registration on the previous frame image t−1 using the first image deformation field, and a first difference in pixel values between the first-level noise-reduced image of the current frame image t and the first registered image may be determined. In this way, in the case that the first difference in pixel values is greater than or equal to a preset difference threshold, the parameters of the deformation field generation sub-network may be adjusted by using the first difference in pixel values to obtain a firstly optimized deformation field generation sub-network.

Similarly, the first-level noise-reduced image of the current frame image t and a first-level noise-reduced image of the frame image before the previous frame image t−2 may be input into the firstly optimized deformation field generation sub-network, to obtain a second image deformation field output from the firstly optimized deformation field generation sub-network. Then, a second registered image may be obtained by performing a registration on the frame image before the previous frame image t−2 using the second image deformation field, and a second difference in pixel values between the first-level noise-reduced image of the current frame image t and the second registered image may be determined. In this way, in the case that the second difference in pixel values is greater than or equal to the preset difference threshold, the parameters of the firstly optimized deformation field generation sub-network may be adjusted by using the second difference in pixel values to obtain a secondly optimized deformation field generation sub-network.

When the number of the continuously captured images is larger, the above optimization method may be used to make the difference in pixel values less than the difference threshold.

In this example, the parameters of the deformation field generation sub-network may be optimized through back-propagation by using the difference in pixel values between the first-level noise-reduced image of the current image and the registered image, which improves the accuracy of the image deformation field generated by the deformation field generation sub-network, and optimizes the deformation field generation sub-network and the time-domain noise reduction network.

In an example, a large-size image in the training set may be cropped into a small-size image such as a 256×256 square image step, which may be used for training.

If the number of images in the training set is larger, the images in the training set may be divided, for example, every N images may be divided into a training group to obtain M training groups, where N and M are both positive integers, and N may be set according to needs and experience, for example, N may be 4 or 6. According to the ordering of the M training groups, the M training groups may be sequentially input into the network to train the network M times. Afterwards, the M training groups may be input into the network again to further optimize the network according to the above method.

An optimization speed of the network parameters may be set as needed. For example, every time a training group is input into the network, the optimization speed of the network parameters, that is, a learning rate of the network is 0.0001. The number of loop iterations of the M training groups may be set as needed. For example, the number of loop iterations of the M training groups is 100, and optimization of the network may be completed after 100 loop iterations of the M training groups.

Corresponding to the foregoing image processing method, the present disclosure also provides examples of an image processing apparatus and system.

Figure 4:
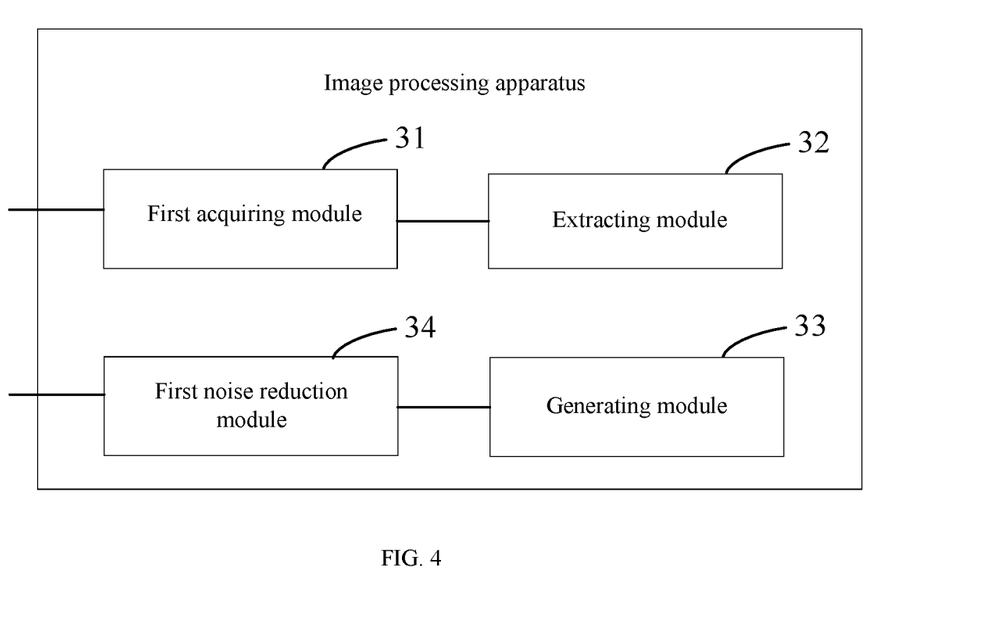
FIG. 4 is a schematic diagram illustrating an image processing apparatus according to an example of the present disclosure.

FIG. 4 is a schematic diagram illustrating an image processing apparatus according to an example of the present disclosure. As shown in FIG. 4, the apparatus includes a first acquiring module 31, an extracting module 32, a generating module 33, and a first noise reduction module 34. The first acquiring module 31 is configured to acquire an image to be processed, which involves a target object. The extracting module 32 is configured to extract image noise information and contour information of the target object from the image to be processed. The generating module 33 is configured to generate a noise distribution image based on the image noise information and the contour information of the target object. The first noise reduction module 34 is configured to obtain a target image by performing noise reduction on the image to be processed with the noise distribution image.

In an example, based on the apparatus shown in FIG. 4, a neural network including an information extraction sub-network and an image generation sub-network is used to implement the apparatus. Correspondingly, the extracting module 32 may be configured to use the information extraction sub-network to extract the image noise information and the contour information of the target object from the image to be processed, and the generating module 33 may be configured to use the image generation sub-network to generate the noise distribution image based on the image noise information and the contour information of the target object.

In an example, the apparatus may further include a second acquiring module, an inputting module, a second noise reduction module, and an adjusting module. The second acquiring module may be configured to acquire a first sample image and a second sample image, where the first sample image is labelled with pixel information and sample contour information, and the second sample image is obtained by adding noise to the first sample image. The inputting module may be configured to input the second sample image into the neural network to obtain a sample noise distribution image output from the neural network. The second noise reduction module may be configured to obtain a sample target image by performing noise reduction on the second sample image with the sample noise distribution image. The adjusting module may be configured to adjust network parameters of the image generation sub-network based on differences in pixel values and contour information between the first sample image and the sample target image.

In an example, based on the apparatus shown in FIG. 4, the first noise reduction module 34 may include a first determining sub-module. The first determining sub-module may be configured to determine a difference in pixel values between the image to be processed and the noise distribution image to obtain the target image.

In an example, based on the apparatus shown in FIG. 4, the first noise reduction module 34 may include a second determining sub-module, a registering sub-module and a noise reduction sub-module. The second determining sub-module may be configured to determine the difference in pixel values between the image to be processed and the noise distribution image to obtain a first-level noise-reduced image of the image to be processed. The registering sub-module may be configured to obtain a registered image by performing a registration, with taking the first-level noise-reduced image of the image to be processed as a registration target, on a first-level noise-reduced image of a historical image which is captured before the image to be processed. The noise reduction sub-module may be configured to perform time-domain noise reduction on the first-level noise-reduced image of the image to be processed based on the registered image to obtain the target image.

Figure 5:
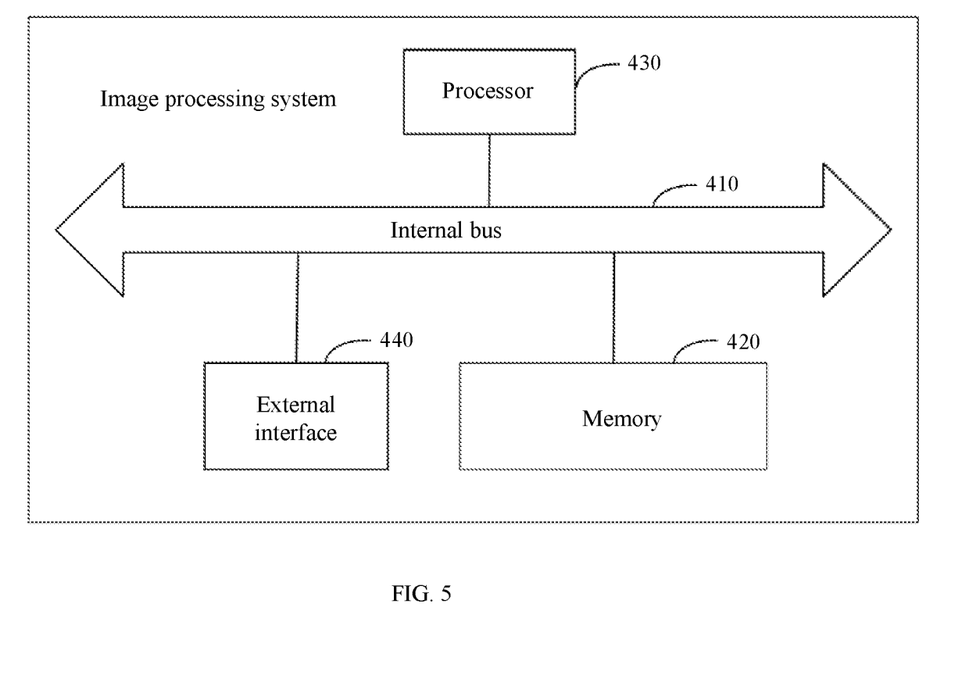
FIG. 5 is a schematic diagram illustrating an image processing system according to an example of the present disclosure.

FIG. 5 is a schematic diagram illustrating an image processing system according to an example of the present disclosure. As shown in FIG. 5, the image processing system may include an internal bus 410, and a memory 420, a processor 430, and an external interface 440 connected through the internal bus 410.

The external interface 440 is configured to obtain data.

The memory 420 is configured to store machine-readable instructions.

The processor 430 is configured to read the machine-readable instructions in the memory 420, and execute the instructions to: acquire an image to be processed, which involves a target object; extract image noise information and contour information of the target object from the image to be processed; generate a noise distribution image based on the image noise information and the contour information of the target object; and obtain a target image by performing noise reduction on the image to be processed with the noise distribution image.

The examples of the present disclosure also provide a computer-readable storage medium storing a computer program therein, and the computer program, when executed by a processor, causes the processor to perform the image processing method disclosed in the above examples of the present disclosure.

In the disclosed examples, the computer-readable storage medium may be in various forms. For example, in different examples, the computer-readable storage medium may include: RAM (Radom Access Memory), volatile memory, non-volatile memory, flash memory, storage drives (such as hard disk drives), solid state drives, any type of storage disks (such as optical disks, DVDs, etc.), or similar storage media, or a combination thereof. In particular, the computer-readable storage medium may also include paper or other suitable medium capable of printing programs. Using these media, these programs may be obtained by electrical means (for example, optical scanning), may be compiled, interpreted, and processed in a suitable manner, and then may be stored in computer media.

The above are merely some examples of the present disclosure, and are not intended to limit the present disclosure. Any modification, equivalent replacement, improvement, etc. made within the spirit and principle of the present disclosure shall fall within the protection scope of the present disclosure.

The invention claimed is:

1. An image processing method, comprising:
   acquiring an image to be processed that involves a target object;
   extracting image noise information and contour information of the target object from the image to be processed;
   generating a noise distribution image based on the image noise information and the contour information of the target object; and
   obtaining a target image by performing noise reduction on the image to be processed with the noise distribution image.

2. The method of claim 1,
   wherein extracting the image noise information and the contour information of the target object from the image to be processed comprises:
      extracting the image noise information and the contour information of the target object from the image to be processed using an information extraction sub-network of a neural network, and
   wherein generating the noise distribution image based on the image noise information and the contour information of the target object comprises:
      generating the noise distribution image based on the image noise information and the contour information of the target object using an image generation sub-network of the neural network.

3. The method of claim 2, further comprising training the image generation sub-network by
   acquiring a first sample image and a second sample image, wherein the first sample image is labelled with pixel information and sample contour information, and the second sample image is obtained by adding noise to the first sample image;
   inputting the second sample image into the neural network to obtain a sample noise distribution image output from the neural network;
   obtaining a sample target image by performing noise reduction on the second sample image with the sample noise distribution image; and
   adjusting network parameters of the image generation sub-network based on a difference in pixel values between the first sample image and the sample target image and a difference in contour information between the first sample image and the sample target image.

4. The method of claim 3, wherein adjusting the network parameters of the image generation sub-network based on the difference in pixel values between the first sample image and the sample target image and the difference in contour information between the first sample image and the sample target image comprises:
   determining a statistical value based on the difference in pixel values and the difference in contour information; and adjusting the network parameters of the image generation sub-network such that the statistical value is less than a preset value.

5. The method of claim 4, wherein each of the difference in pixel values and the difference in contour information is expressed in a form of a pixel matrix, and wherein determining the statistical value based on the difference in pixel values and the difference in contour information comprises:

performing a weighted summation on the difference in pixel values and the difference in contour information.

6. The method of claim 1, wherein obtaining the target image by performing noise reduction on the image to be processed with the noise distribution image comprises:

obtaining the target image by determining a difference in pixel values between the image to be processed and the noise distribution image.

7. The method of claim 1, wherein obtaining the target image by performing noise reduction on the image to be processed with the noise distribution image comprises:

determining a difference in pixel values between the image to be processed and the noise distribution image to obtain a first-level noise-reduced image of the image to be processed;

obtaining a registered image by performing a registration, with taking the first-level noise-reduced image of the image to be processed as a registration target, on a first-level noise-reduced image of a historical image captured before the image to be processed; and obtaining the target image by performing time-domain noise reduction on the first-level noise-reduced image of the image to be processed based on the registered image.

8. The method of claim 7, wherein obtaining the registered image comprises:

determining an image deformation field based on the first-level noise-reduced image of the image to be processed and the first-level noise-reduced image of the historical image, and obtaining the registered image by registering the first-level noise-reduced image of the historical image to the first-level noise-reduced image of the image to be processed by using the image deformation field.

9. The method of claim 8, wherein determining the image deformation field comprises using a deformation field generation sub-network of a neural network, and wherein the method further comprises training the deformation field generation sub-network by:

acquiring a plurality of sample images;

for each of the plurality of sample images, obtaining a noise distribution image of the sample image;

obtaining a first-level noise-reduced image of the sample image based on a difference in pixel values between the sample image and the noise distribution image of the sample image;

inputting a first-level noise-reduced image of a corresponding historic image and the first-level noise-reduced image of the sample image into the deformation field generation sub-network to obtain a corresponding image deformation field;

obtaining a corresponding registered image by performing a corresponding registration on the first-level noise-reduced image of the corresponding historical image using the corresponding image deformation field;

determining a corresponding difference in pixel values between the first-level noise-reduced image of the sample image and the corresponding registered image; and adjusting network parameters of the deformation field generation sub-network based on the corresponding difference in pixel values.

10. An image processing system comprising:

at least one processor;

one or more memories coupled to the at least one processor and storing programming instructions for execution by the at least one processor to perform operations comprising:

acquiring an image to be processed that involves a target object;

extracting image noise information and contour information of the target object from the image to be processed;

generating a noise distribution image based on the image noise information and the contour information of the target object; and obtaining a target image by performing noise reduction on the image to be processed with the noise distribution image.

11. The image processing system of claim 10, wherein extracting the image noise information and the contour information of the target object from the image to be processed comprises:

extracting the image noise information and the contour information of the target object from the image to be processed using an information extraction sub-network of a neural network, and wherein generating the noise distribution image based on the image noise information and the contour information of the target object comprises:

generating the noise distribution image based on the image noise information and the contour information of the target object using an image generation sub-network of the neural network.

12. The image processing system of claim 11, wherein the operations further comprise training the image generation sub-network by:

acquiring a first sample image and a second sample image, wherein the first sample image is labelled with pixel information and sample contour information, and the second sample image is obtained by adding noise to the first sample image;

inputting the second sample image into the neural network to obtain a sample noise distribution image output from the neural network;

obtaining a sample target image by performing noise reduction on the second sample image with the sample noise distribution image; and adjusting network parameters of the image generation sub-network based on a difference in pixel values between the first sample image and the sample target image and a difference in contour information between the first sample image and the sample target image.

13. The image processing system of claim 12, wherein adjusting the network parameters of the image generation sub-network based on the difference in pixel values between the first sample image and the sample target image and the difference in contour information between the first sample image and the sample target image comprises:

determining a statistical value based on the difference in pixel values and the difference in contour information; and adjusting the network parameters of the image generation sub-network such that the statistical value is less than a preset value.

14. The image processing system of claim 13, wherein each of the difference in pixel values and the difference in contour information is expressed in a form of a pixel matrix, and wherein determining the statistical value based on the difference in pixel values and the difference in contour information comprises:

performing a weighted summation on the difference in pixel values and the difference in contour information.

15. The image processing system of claim 10, wherein obtaining the target image by performing noise reduction on the image to be processed with the noise distribution image comprises:

obtaining the target image by determining a difference in pixel values between the image to be processed and the noise distribution image.

16. The image processing system of claim 10, wherein obtaining the target image by performing noise reduction on the image to be processed with the noise distribution image comprises:

determining a difference in pixel values between the image to be processed and the noise distribution image to obtain a first-level noise-reduced image of the image to be processed;

obtaining a registered image by performing a registration, with taking the first-level noise-reduced image of the image to be processed as a registration target, on a first-level noise-reduced image of a historical image which is captured before the image to be processed; and obtaining the target image by performing time-domain noise reduction on the first-level noise-reduced image of the image to be processed based on the registered image.

17. The image processing system of claim 16, wherein obtaining the registered image comprises:

determining an image deformation field based on the first-level noise-reduced image of the image to be processed and the first-level noise-reduced image of the historical image, and obtaining the registered image by registering the first-level noise-reduced image of the historical image to the first-level noise-reduced image of the image to be processed by using the image deformation field.

18. The image processing system of claim 17, wherein determining the image deformation field comprises using a deformation field generation sub-network of a neural network, and wherein the operations further comprise training the deformation field generation sub-network by:

acquiring a plurality of sample images;

for each of the plurality of sample images, obtaining a noise distribution image of the sample image;

obtaining a first-level noise-reduced image of the sample image based on a difference in pixel values between the sample image and the noise distribution image of the sample image;

inputting a first-level noise-reduced image of a corresponding historic image and the first-level noise-reduced image of the sample image into the deformation field generation sub-network to obtain a corresponding image deformation field;

obtaining a corresponding registered image by performing a corresponding registration on the first-level noise-reduced image of the corresponding historical image using the corresponding image deformation field;

determining a corresponding difference in pixel values between the first-level noise-reduced image of the sample image and the corresponding registered image; and adjusting network parameters of the deformation field generation sub-network based on the corresponding difference in pixel values.

19. A non-transitory computer-readable storage medium coupled to at least one processor and storing programming instructions for execution by the at least one processor, wherein the programming instructions instruct the at least one processor to:

acquire an image to be processed that involves a target object;

extract image noise information and contour information of the target object from the image to be processed;

generate a noise distribution image based on the image noise information and the contour information of the target object; and obtain a target image by performing noise reduction on the image to be processed with the noise distribution image.

* * * * *